United States Patent [19]

Thordarson

[11] 4,379,434
[45] Apr. 12, 1983

[54] LIQUID LEVEL SENSOR AND ALARM SYSTEM

[76] Inventor: Petur Thordarson, Seattle, Wash.

[21] Appl. No.: 158,288

[22] Filed: Jun. 10, 1980

[51] Int. Cl.³ .......................................... G01F 23/08
[52] U.S. Cl. ...................................... 116/228; 73/308; 116/110
[58] Field of Search ............... 116/228, 267, 110, 204; 73/308

[56] References Cited

U.S. PATENT DOCUMENTS

| | | | |
|---|---|---|---|
| 1,284,920 | 11/1918 | Nielson | 116/110 |
| 2,853,041 | 9/1958 | Oakes . | |
| 2,882,853 | 4/1959 | Reeves . | |
| 3,212,539 | 10/1965 | Felix . | |
| 3,233,625 | 2/1966 | Pase . | |
| 3,368,405 | 2/1968 | Christian | 116/228 |
| 3,377,698 | 12/1973 | Hunter . | |
| 3,675,614 | 7/1973 | Ward | 116/118 |
| 3,751,086 | 8/1973 | Geringer . | |

Primary Examiner—Robert I. Smith

[57] ABSTRACT

A float is moved upwardly or downwardly by liquid being added to a liquid holding tank. The float carries a first permanent magnet which is moved by the float towards a second magnet which is separated therefrom by a liquid tight partition. The permanent magnets are arranged with like poles directed towards each other so that the permanent magnets will repel each other and movement of the first permanent magnet in response to a liquid level change will cause the second permanent magnet to be moved in response to the repelling force. The second permanent magnet is positioned in line with a depressable control member of a normally closed valve in a gas line. Movement of the second permanent magnet against such control member depresses the control member to open the valve, allowing gas to flow from a storage tank to a piston in a normally closed valve that is located in a second line leading from the gas supply to a horn. The gas pressure moves piston to open the valve and allow a flow of gas to operate the horn.

23 Claims, 6 Drawing Figures

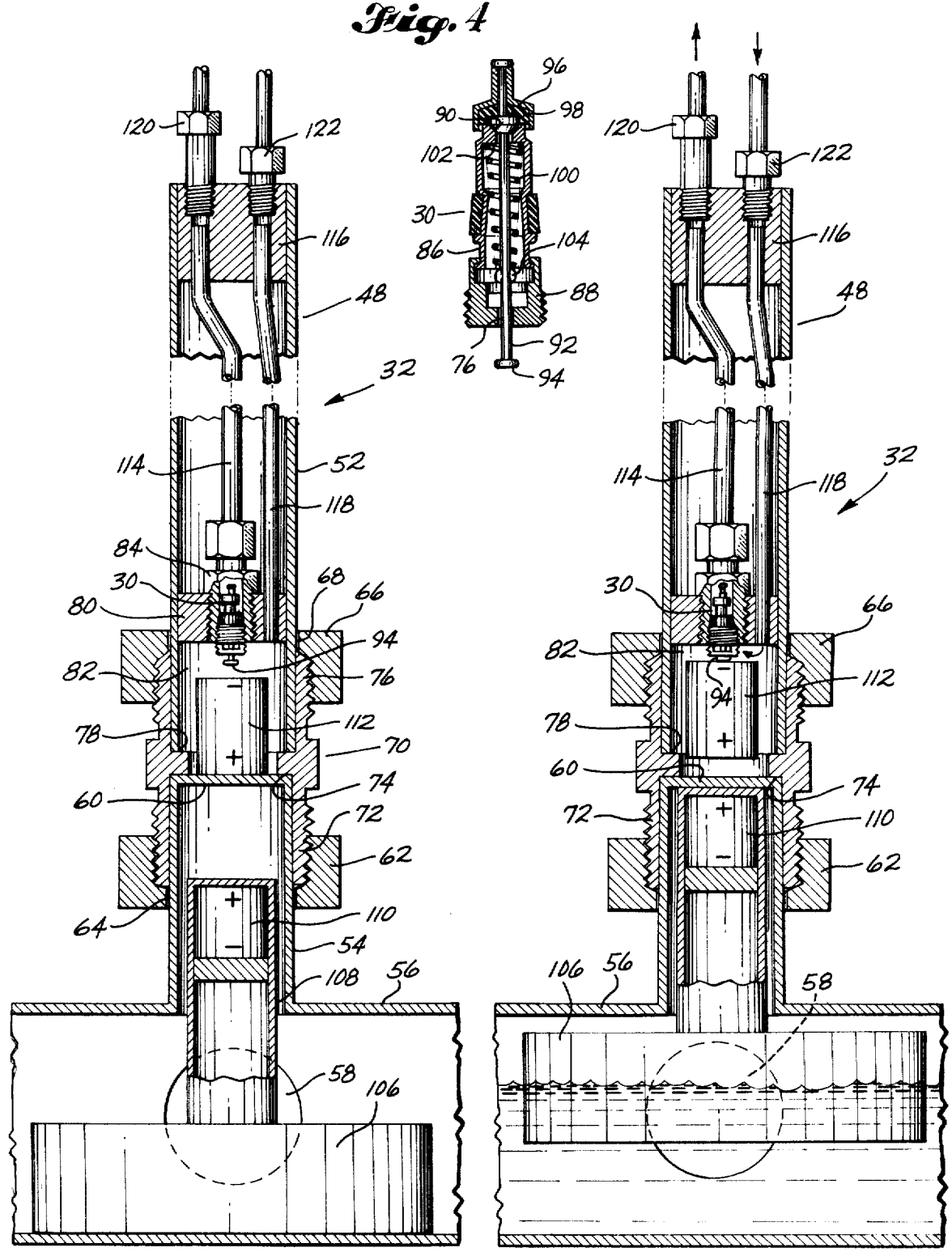

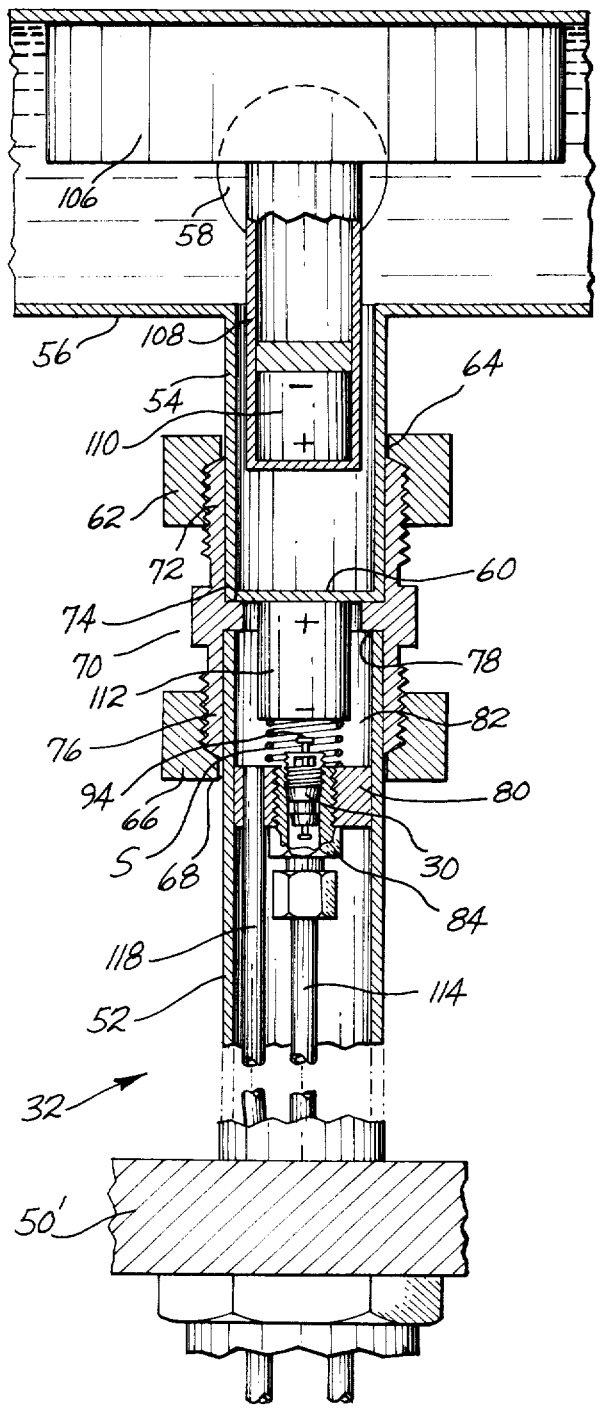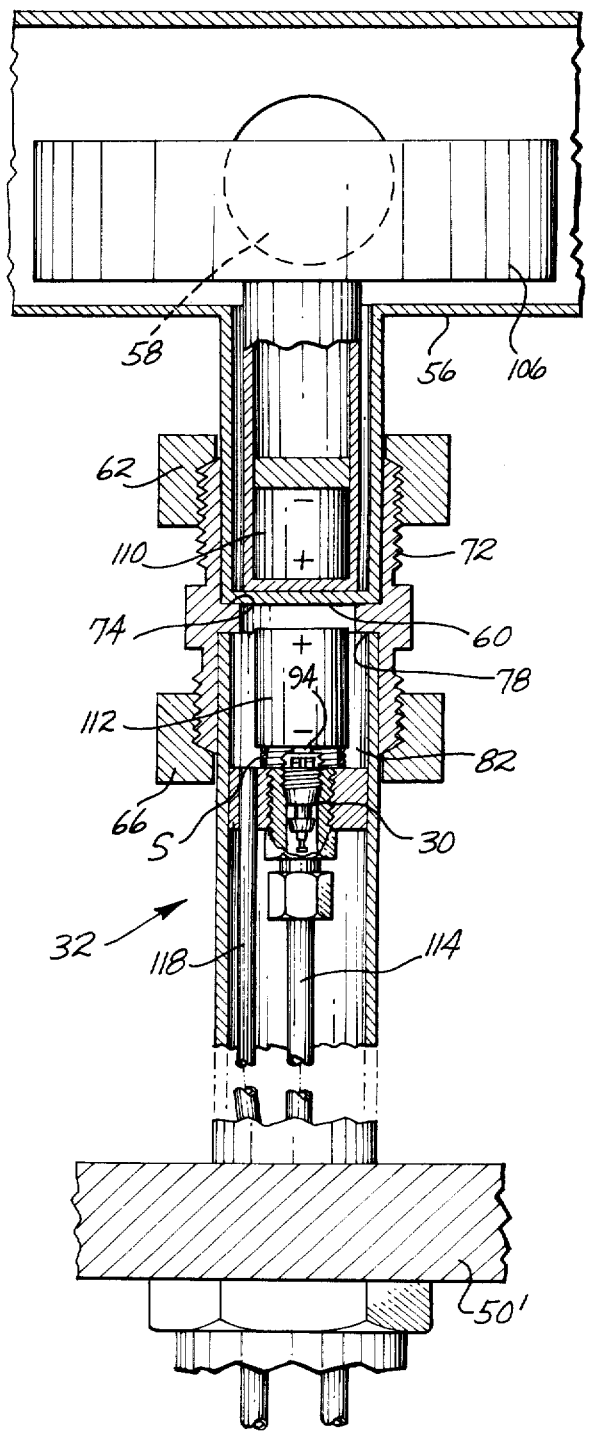

LIQUID LEVEL SENSOR AND ALARM SYSTEM

BACKGROUND OF THE INVENTION

1. Field of the Invention

This invention relates to a float controlled mechanism for operating a liquid level responsive alarm. More particularly it relates to the provision of such a mechanism in which there is no mechanical connection between the float and an alarm triggering device controlled thereby.

2. Description of the Prior Art

Known mechanisms for signaling a full or overflow condition of a liquid holding tank are disclosed by: U.S. Pat. No. 2,882,853, granted Apr. 21, 1959, to Charles E. Reeves; U.S. Pat. No. 3,675,641, granted July 11, 1972, to John T. Ward and Allen B. Keller; and U.S. Pat. No. 3,777,698, granted Dec. 11, 1973, to Bryan J. Hunter. Similar mechanisms for signaling a too low of a level and disclosed by U.S. Pat. No. 1,284,920, granted Nov. 12, 1918 to Niels C. Nielson and U.S. Pat. No. 2,853,041, granted Sept. 23, 1958, to William E. Oakes. U.S. Pat. No. 3,233,625, granted Feb. 8, 1977, to Hugh H. Pase relates to a type of magnetically operated valve having a first magnet that is carried by a float and a second magnet that is incorporated within a valve plug.

These patents should be studied for the purpose of putting the present invention into proper perspective relative to the prior art.

SUMMARY OF THE INVENTION

The liquid level sensor of the present invention is basically characterized by a float which in use is positioned on a body of liquid and carries with it a first permanent magnet which moves as the float moves. A second permanent magnet is located within a chamber that is partitioned from the body of liquid. The second permanent magnet is positioned in line with the first permanent magnet. A normally extended, depressible control member portion of a signal means is positioned in line with said second permanent magnet and is depressible to operate the signal means. The float and the two magnets are so positioned that as the liquid level in the liquid holding tank moves towards said chamber the first permanent magnet is moved by the float towards the second permanent magnet. The two permanent magnets have like poles facing towards each other, so that when the first permanent magnet is moved a predetermined amount towards the second permanent magnet, the repelling force of the two magnets will force the second magnet into contact with the control member, depressing said control member to operate the signal.

According to an aspect of the invention, the signal means includes a normally closed valve and the depressible control member operates the valve. The valve is normally closed but depression of the control member opens the valve.

According to another aspect of the invetion, when the valve is open gas is allowed to flow to a mechanism which in response to the gas flow generates a signal, e.g. operates a horn.

In one embodiment of the invention the sensor is adapted to be mounted onto a top portion of a liquid holding tank, to depend down into the tank and function to signal an overflow condition. Another embodiment of the invention is adapted to be secured to a lower portion of the tank, to project upwardly in the tank and function to signal a low level condition of a body of liquid within the tank.

The sensor of the present invention is very significantly characterized by the absense of a physical connection between the float and the operator for the signal device which is controlled by the float. As a result, the float can be placed on one side of a wall and the rest of the sensor can be placed on the opposite side of the wall, and be isolated from the liquid and any elevated pressure within the liquid holding tank. Also, the sensor requires no electrical energy and is devoid of any components which might create a spark, enabling the sensor to be used with volatile liquids of a type which could be ignited by a spark.

Furthermore, the fact that there is no physical connection between the float the control member that is operated by the position of the float makes it much easier and less expensive to construct and maintain the sensor.

Additional objects, features and advantages of the invention are described below in the detailed description of the preferred embodiments, and are defined in the appended claims.

It is intended that this Summary of Invention and the appended claims, constitute descriptions of the invention.

BRIEF DESCRIPTION OF THE DRAWING

Referring to the drawing wherein like reference characters designate like parts throughout the several views, FIG. 1 diagramatially illustrates a preferred embodiment of the system aspect of the invention;

FIG. 2 is a vertical sectional view taken through a preferred embodiment of the float operated valve assembly of the invention, such view showing the float and the magnetic operators positioned such that the control line valve is in its normally closed position;

FIG. 3 is a view like FIG. 2, but showing the float moved upwardly by liquid in the liquid holding tank, and showing the magnetic operators positioned to move such valve into its open position;

FIG. 4 is an enlarged scale sectional view of the valve mechanism;

FIG. 5 is a view like 2, but of a tank bottom mounted form of the invention; and FIG. 6 is a view like FIG. 3, but of the embodiment shown by FIG. 5.

DETAILED DESCRIPTION OF THE PREFERRED EMBODIMENT

Figure 1:
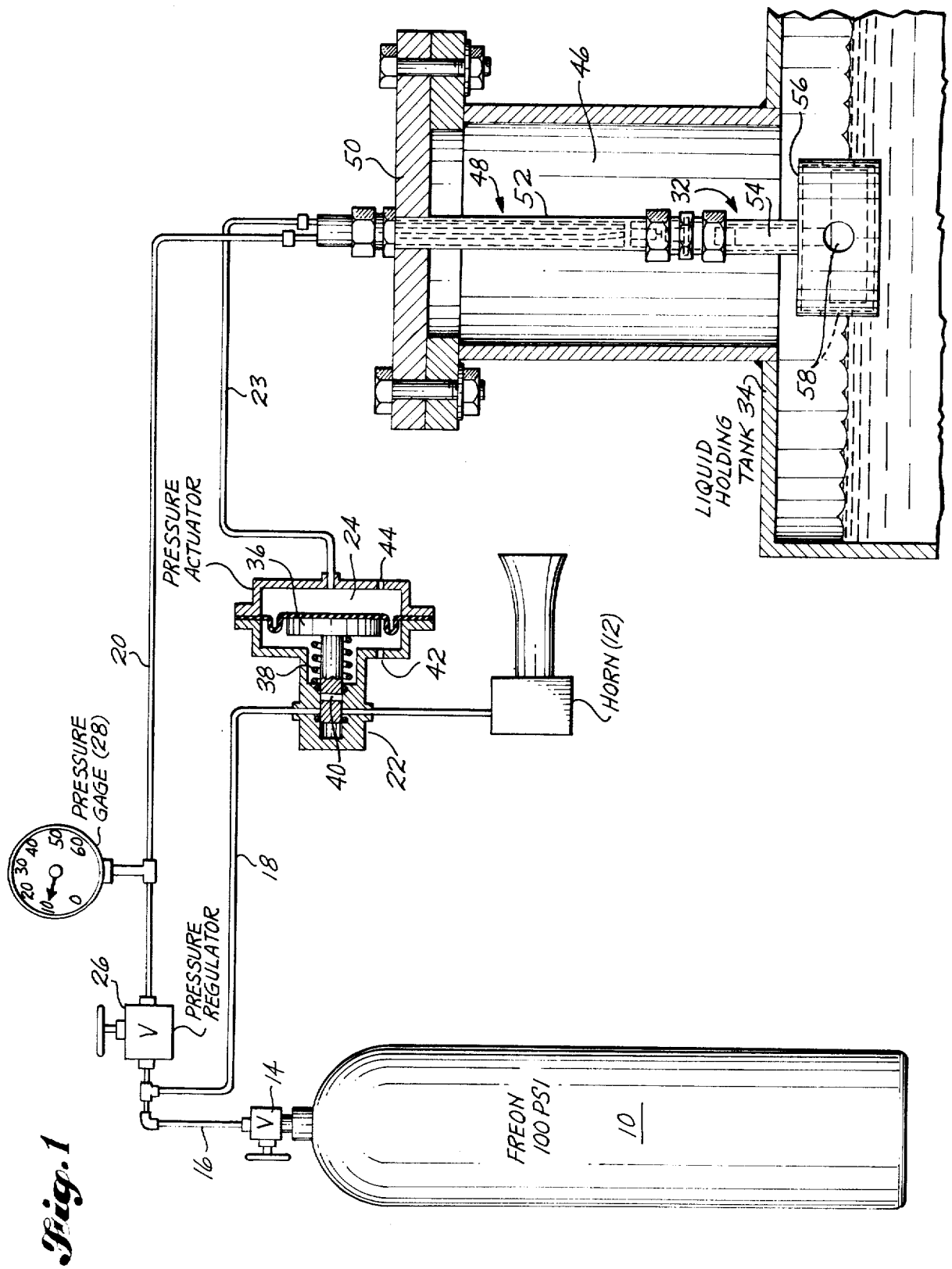

Referring to FIG. 1, compressed gas, e.g. Freon 12, stored within a pressure bottle 10, is provided for powering a signal horn 12. In the illustrated embodiment, an off-on valve 14 is provided at the outlet of bottle 10. A conduit 16 extends from valve 14 and branches out into two branches lines 18, 20. Branch line 18 leads to signal horn 12 and includes a normally closed off-on valve 22. Branch line 20 supplies gas to an expansible chamber 24 within valve 22, for opening the valve 22, as will hereinafter be described in greater detail.

Branch line 20 includes a manually adjustable pressure regulator 26 and pressure gage 28. Branch line 20 extends from the pressure gage 28 to a normally closed valve 30 within a liquid level sensor 32. Valve 30 remains closed as long as the liquid level is below a predetermined maximum, i.e. a full condition, within the liquid holding tank 34. In a manner to be hereinafter described in some detail, the valve 30 will be moved to an open position in response to the liquid holding tank 34 becoming full. With valve 30 open, gas will flow into chamber 24 and will move piston 36 to the left, as pictured, against the force of a return spring 38 until a transverse port 40 in the valve plug is moved into alignment with the incoming and outgoing sections of conduit 18. Of course, this opening of the valve 22 allows gas to flow to the signal horn 12. Operation of horn 12 signals the operator that the liquid holding tank 34 is full so that he can turn off the supply of liquid.

The chamber on the valve plug side of piston 36 is vented to the atmosphere by a small vent hole 42, so that air will not become trapped in it and retard movement of the piston 36 in the valve opening direction. Chamber 24 is provided with a small bleed opening 44 which allows gas to escape from chamber 24 at a very slow rate. Opening 44 does not prevent the build up of gas pressure within chamber 24 for moving piston 36 to open the valve 22. However, it permits the chamber 24 to empy after valve 30 has been closed, so that the valve 22 can be moved by the spring 36 back into and off the position, to shut of the signal horn 12.

The liquid holding tank 34 is a normally closed tank. By way of typical and therefore nonlimitive example, it may be a storage tank for a volatile acid.

Liquid holding tank 34 may be constructed to include a top opening 46 for receiving the liquid level sensor 32. According to an aspect of the invention, liquid level sensor 32 comprises a tubular body or support tube 48 which is secured at its upper end to a closure or cover plate 50 for the opening 46.

As best shown by FIGS. 2 and 3, the support tube 48 comprises an upper section 52 and a lower section 54. The lower section 54 is a tubular extension of a float cage 56. Float cage 56 may be in the nature of a cylindrical chamber having a plurality of openings 58 for permitting liquid within the liquid holding tank 34 to enter into the float cage 56 so that the liquid level in the float cage 56 is the same as in the tank proper. The upper end of section 54 is closed by a transverse wall 60, providing a liquid and pressure tight seal between the interior of tank 34 and the sensor components above wall 60.

In preferred form, a first nut 62, presenting an upwardly directed, internally threaded opening, is secured at 64 to the tubular section 54, at a location spaced inwardly of closure wall 60. In similar fashion, a second nut 66 is secured to a lower portion of support tube section 56, at location 68. Nut 66 presents a downwardly opening, internally threaded opening, spaced endwise inwardly of the lower end of tube 52. The support tube sections 52, 54 are connected together by a connector or nipple 70 having an externally threaded end portion at each of its ends. Nut 62 is screwed onto the lower end portion 72 until top closure wall 60 seats against a shoulder 74 provided within an intermediate portion of connector 70. Nut 66 is screwed onto the upper end portion 76 until the lower end of support tube section 52 seats against a second shoulder 78 formed within connector 70.

A transverse wall 80 is provided within support tube section 52, upwardly from the lower end thereof, so that when the two sections 52, 54 are connected together a chamber 82 of substantial size is formed vertically between transverse walls 60 and 80.

Transverse wall 80 includes an internally threaded central opening adapted to receive an externally threaded end portion of a connector element 84. The lower end of such connector element 84 is internally threaded and receives the normally closed valve 80. Preferably, valve 30 is a standard tire valve assembly. Referring to FIG. 4, it may comprise a tubular body 86 having an externally threaded end portion 88 and an end orifice 90 at its opposite. The control member or stem 92 extends axially through the tubular body 86. It includes a downwardly directed, normally extending end portion which extends axially beyond the threaded portion 88 and terminates in an enlarged head 94. The opposite end of control member 92 is connected to a valve plug 96 which may include a body of resilient material 98 arranged to seat against the end surface of tubular body 86, about the control orifice 90. A coil spring 100 is located within tubular body 86, in surrounding relationship to the control stem 92. The upper end of spring 100 abuts an internal shoulder 102 formed within body 96. The lower end of spring 100 abuts against a laterally projecting portion 104 of the control member 92. The spring 100 is always slightly compressed so that it normally biases the valve plug 96 into a seated position.

Referring again to FIGS. 1–3, a float 106 is contained within the float cage 56. Float 106 includes an upwardly extending stem portion which projects into the lower section 54 of the support tube 48. A first permanent magnet 110 is housed within the upper end portion of stem 108. One pole, e.g. the positive pole, of magnet 110 is directed upwardly.

A second permanent magnet 112 is located within chamber 82. It is a free body within chamber 82 and is arranged so that its downwardly directed pole matches the upwardly directed pole of magnet 110. When the components of the sensor 32 are positioned in the manner shown by FIG. 2, the second permanent magnet 112 is positioned by gravity on transverse wall 60. When it is so positioned a space exists between its upper end the lower end or head portion 94 of the control member portion of valve 30. Also, the two magnets 110, 112 are spaced apart far enough that neither has much influence on the other.

In operation, when the liquid level within liquid holding tank 34 reaches the level of the openings 58, it will enter into the float cage 56 and exert a buoyant force on the float 106, causing it to float upwardly as additional liquid is added to the tank 34. As the float 106 rises it moves permanent magnet 110 upwardly until the two magnets 110, 112 are close enough together that the repelling force acting between them, as a result of like poles being directed towards each other, forces magnet 112 upwardly into depressing contact with head portion 94 of valve control member 92. Thus, in this manner, the valve control member 92 is depressed and the valve 30 is opened in response to the liquid level within tank 34 reaching a predetermined maximum or full condition. The force couple of the two magnets 110, 112 is employed so that a completely liquid and/or pressure tight closure, provided by wall 60, can be maintained between the interior of tank 34 and the interior of the sensor.

In the preferred embodiment the normally closed valve 30 is located within the outlet port of chamber 82. An outflow conduit 114 is suitably attached to the fitting 84 and extends upwardly from it through the interior of support tube section 52 and at its upper end is embedded within a closure plug 116. In similar fashion, an inflow tube 118 is embedded at its upper end in the closure plug 116 and extends therefrom down to and through the transfer wall 80. Tube 114 includes a connector 120 positioned outboardly of cover 50 to which gas delivery conduit 20 is attached. Conduit 118 includes a connector 122 positioned outwardly of cover 50 to which conduit 23 is attached.

FIGS. 5 and 6 disclose the sensor of FIGS. 2 and 3 mounted on a bottom portion of liquid holding tank. The sensor may be mounted in place in a number of different ways. For example, a pipe of a type shown in FIG. 1, secured to the top wall of the tank, may in like fashion be secured to the bottom of the tank. The lower end of such pipe may be provided with a cover 50 which is bolted or otherwise secured to the lower end portion of the pipe. One small change must be make to the sensor when it is used at the bottom of the tank, to detect a low level condition of liquid in the tank. For this reason, in FIGS. 5 and 6 the same reference numberals are used for the parts of the sensor 32 which are identical to the parts used in the sensor of FIGS. 2 and 3. The only change that must be made is that the second permanent magnet 112 must be supported above the control member 92. By way of example, this may be done by locating a light spring S between the lower magnet 112 and transverse wall 80. Spring S need do no more than compensate for the weight of magnet 112. A spring can be chosen which will hold the second magnet 112 into the position shown by FIG. 5 but which can be easily overcome by the force of magnetic couple, so that the force of the magnetic couple can be easily move magnet 112 down into the position shown by FIG. 6 in which it contacts and depresses the control member 92.

The various parts of the sensor 32 other than the two magnets 110, 112 and the valve 30 are constructed from a suitable structural plastic material, such as polyvinyl chloride, nylon, etc. Of course, plastic materials are non-magnetic, so that they will have no influence on the two magnets 110, 112, and plastic materials are available which will not be dissolved by the particular liquid that is being held within the holding tank.

Of course, there are many variations which can be made to be illustrated embodiments of the sensor and/or the alarm system. Accordingly, the above described embodiments are to be considered in all respects as being merely illustrative and not restrictive. The scope of the invention is to be determined by the appended claims rather than by the foregoing description. It is intended that all changes in construction which come within the meaning and range of equivalency of the claims are to be embraced by the claims.

What is claimed is:

1. Apparatus for determining a liquid level condition of a liquid within a holding tank, comprising:
    a float adapted to be positioned on a body of liquid within a liquid holding tank, including a first permanent magnet;
    means defining a chamber partitioned in a fluid tight manner from the body of liquid;
    a second permanent magnet located within said chamber in line with said first permanent magnet;
    means forming a gas inlet port for said chamber and means forming a gas outlet port for said chamber; and
    signal means comprising a normally closed valve positioned within one of said ports, said valve including a normally extended valve stem which is in line with said second permanent magnet and is depressible to operate the signal means and which projects into said chamber and when depressed opens said valve;
    wherein the float and the two magnets are so positioned that as the liquid level in the liquid holding tank moves towards said chamber the first permanent magnet is moved by the float towards the second permanent magnet, and wherein the two permanent magnets have like poles facing towards each other, so that when the first permanent magnet is moved a predetermined amount towards the second permanent magnet, the two magnets will tend to repel each other and in response the second magnet will be urged into contact with the valve stem, moving such valve stem into a signal operating position.

2. Apparatus for determining a liquid level condition of a liquid within a liquid holding tank, comprising:
    a float adapted to be positioned on a body of liquid within a liquid holding tank, including a first permanent magnet, one pole of which is directed upwardly;
    means defining a chamber partitioned in a fluid tight manner from the body of liquid;
    a second permanent magnet located within said chamber above and in line with said first permanent magnet;
    means forming a gas inlet port for said chamber and means forming a gas outlet port for said chamber; and
    a normally closed valve positioned above said second permanent magnet and within one of said ports and including a normally extended control member which is in line with said second permanent magnet, is depressible to open the valve, and projects into said chamber;
    wherein the float and the two magnets are so positioned that as the liquid level rises in the liquid holding tank the first permanent magnet is moved towards the second permanent magnet, and wherein the two permanent magnets have like poles facing towards each other, so that when the first permanent magnet is moved upwardly by the float a predetermined amount towards the second permanent magnet, by liquid being added to the liquid holding tank, the two magnets will tend to repel each other and in response the second magnet will be urged upwardly into contact with the valve control member, moving such valve control member into a valve opening position.

3. A liquid level sensor for use with a normally closed liquid holding tank having a top opening and a closure for such top opening which is connectable to the tank, said sensor comprising:
    a support tube which is connectable to the closure for the top opening in the liquid holding tank, to depend therefrom into the tank;
    a float adapted to float upon liquid in said liquid holding tank, said float carrying an upwardly directed first permanent magnet positioned within the lower portion of said support tube;
    transverse wall means within said support tube, completing a fluid tight closure above said first permanent magnet;
    a second permanent magnet positioned above said transverse wall means;
    a normally closed valve located within said support tube above said second permanent magnet, said valve including a normally extending control member which is depressible to open the valve, said control member being positioned above the second permanent magnet; and with said first and second permanent magnets being arranged to have like poles facing each other, and with the arrangement of the float and the two magnets being such that when the float is moved upwardly a predetermined amount by liquid being added to the liquid holding tank, the float will move the first permanent magnet towards the second permanent magnet, and a repelling force generated by the two magnets will cause the second permanent magnet to be lifted upwardly against the control member for the valve, depressing such control member to in that manner open the valve.

4. A liquid level sensor according to claim 3, wherein a cage for the float is connected to the lower end of said support tube, and said float is located within said cage.

5. A liquid level sensor according to claim 4, wherein a chamber is formed within said support tube, above said transverse wall means and below said normally closed valve, said sensor further comprising means defining an inlet port leading into said chamber and an outlet port leading out from said chamber, and wherein said valve is located within one of said ports, with its control member projecting into said chamber, and wherein said second permanent magnet is located within said chamber.

6. A liquid level sensor according to claim 5, comprising an inflow conduit means extending upwardly through said support tube from said inlet port to a fitting at its upper end, and an outflow conduit extending through said support tube from said outlet to a fitting at its upper end, said fittings being positioned outboardly of the closure for the top opening in the liquid holding tank.

7. A liquid level sensor for use with a normally closed liquid holding tank having a top opening and a closure for such top opening which is connectable to the tank, comprising:

a support tube having an upper section with an upper end which is connectable to the closure for the top opening in the liquid holding tank, to depend therefrom into the tank, and a lower end, and a lower section having an upper end connectable to the lower end of said upper section, and including a float cage at its lower end;

a float within said float cage, adapted to float upon liquid within said liquid holding tank, said float including an upwardly projecting stem portion which is located within the lower section of said support tube;

a first permanent magnet carried by the stem portion of said float;

transverse wall means within said support tube completing a fluid tight closure above said first permanent magnet and also completing a chamber within said support tube above said transverse wall;

a second permanent magnet located within said chamber;

a normally closed valve located within said support tube above said second permanent magnet, said valve including a downwardly directed, normally extended control member which is depressible to open the valve, said control member being positioned above the second permanent magnet; and with said first and second permanent magnets being arranged to have like poles facing each other, and with the arrangement of the float and permanent magnets being such that when the float is moved upwardly a predetermined amount by liquid being added to the liquid holding tank the float will move the first permanent magnet towards the second permanent magnet, and the repelling force of the two permanent magnets will cause the second permanent magnet to be lifted upwardly against the control member for the valve, depressing such control member to in that manner open the valve.

8. A liquid level sensor according to claim 7, comprising screw type connector means for connecting the two sections of the support tube together.

9. A liquid level sensor according to claim 8, wherein the screw type connector means comprises a nipple having an externally threaded section at each of its ends, and wherein each section of the support tube carries a threaded nut which is threadably connected to a respective one of the threaded end portions of the nipple.

10. Apparatus for signaling a full condition of a liquid holding tank, comprising:

a supply of pressurized gas;

a gas operated sound generator having an inlet for operating gas;

first gas supplying conduit means extending from the supply of pressurized gas to said gas inlet, said first gas supplying conduit means including a normally closed valve means and gas pressure operated means for opening such valve means;

second gas supplying conduit means extending from the supply of pressurized gas to said gas pressure operated means for opening said first valve means;

second normally closed valve means in said second gas supplying conduit means including a downwardly directed, normally extended control member which when depressed will open said second valve means, to allow pressurized gas from the supply of pressurized gas to flow to the gas pressure operated means for opening the first valve means, to in turn allow pressurized gas to flow from the supply of pressurized gas to the sound generator, to operate the sound generator; and means for depressing said control member in response to the liquid holding tank becoming full, comprising:

a float located within said liquid holding tank, said float carrying a first permanent magnet positioned below said second valve means;

means defining a chamber between said first permanent magnet and said second normally closed valve means which includes a fluid tight lower wall;

means defining an inlet port leading into said chamber and an outlet port leading out from said chamber, said second normally closed valve means being located within one of said ports, with its control member projecting into said chamber; and a second permanent magnet located within said chamber, said second permanent magnet being sized so that when it is on said lower wall the control member is extended, said first and second permanent magnets presenting like poles towards each other, so that each permanent magnet will tend to repel the other, said float and said two permanent magnets being arranged such that when the liquid level rises in the liquid holding tank to a predetermined level the first permanent magnet will be moved by the float towards the second permanent magnet and the repelling force of the two magnets will move the second magnet against the operating member, to depress such operating member to in that manner open the second valve means.

11. Apparatus for determining a low liquid level condition of a liquid holding tank, comprising:
   a float adapted to be positioned on a body of liquid within a liquid holding tank, including a first permanent magnet, one pole of which is directed downwardly;
   means defining a chamber partitioned in a fluid tight manner from the body of liquid;
   a second permanent magnet located within said chamber below and in line with said first permanent magnet;
   means forming a gas inlet port for said chamber and means forming a gas outlet port for said chamber;
   a normally closed valve positioned below said second permanent magnet and within one of said ports and including a normally extended control member which is in line with said second permanent magnet, is depressible to open the valve, and projects into said chamber; and
   means normally biasing said second magnet away from contact with said control member;
   wherein the float and the two magnets are so positioned that as the liquid level drops in the liquid holding tank the first permanent magnet is moved towards the second permanent magnet, and wherein the two permanent magnets have like poles facing towards each other, so that when the first permanent magnet moves downwardly with the float a predetermined amount towards the second permanent magnet, by liquid being removed from the liquid holding tank, the two magnets will tend to repel each other and in response the second magnet will be urged downwardly into contact with the valve control member in opposition to said biasing force, moving such valve control member into a valve opening position.

12. A liquid level sensor for use with a normally closed liquid holding tank having a bottom opening and a closure for such bottom opening which is connectable to the tank, said sensor comprising:
   a support tube which is connectable to the closure for the bottom opening in the liquid holding tank, to extend upwardly therefrom into the tank;
   a float adapted to float upon liquid in said liquid holding tank, said float carrying a downwardly directed first permanent magnet positioned within the upper portion of said support tube;
   transverse wall means within said support tube, completing a fluid tight closure below said first permanent magnet;
   a second permanent magnet positioned below said transverse wall means;
   a normally closed valve located within said support tube below said second permanent magnet and above the closure for said bottom opening, said valve including a normally extending control member which is depressible to open the valve, said control member being positioned below the second permanent magnet; and
   means normally biasing the second permanent magnet away from contact with said control member;
   with said fluid tight closure completed by said transverse wall means isolating the second permanent magnet and the normally closed valve in a fluid tight manner from the interior of the holding tank; and
   with said first and second permanent magnets being arranged to have like poles facing each other, and with the arrangement of the float and the two magnets being such that when the float moves downwardly a predetermined amount by liquid being removed from the liquid holding tank, the float will move the first permanent magnet towards the second permanent magnet, and a repelling force generated by the two magnets will cause the second permanent magnet to be forced downwardly against the control member for the valve, in opposition to the biasing force, depressing such control member to in that manner open the valve.

13. A liquid level sensor according to claim 12, wherein a cage for the float is connected to the upper end of said support tube, and said float is located within said cage.

14. A liquid level sensor for use with a liquid holding tank, said sensor comprising:
   a support tube which is connectable to a bottom portion of the tank, to extend upwardly therefrom into the tank;
   a float adapted to float upon liquid in said liquid holding tank, said float carrying a downwardly directly first permanent magnet positioned within the upper portion of said support tube, and said float being located within a cage for said float, said cage being connected to the upper end of said support tube;
   transverse wall means within said support tube, completing a fluid tight closure below said first permanent magnet;
   a second permanent magnet positioned below said transverse wall means;
   a normally closed valve located within said support tube below said second permanent magnet, said valve including a normally extending control member which is depressible to open the valve, said control member being positioned below the second permanent magnet; wherein a chamber is formed within said support tube, below said transverse wall means and above said normally closed valve;
   means defining an inlet port leading into said chamber and an outlet port leading out from said chamber; and
   means normally biasing the second permanent magnet away from contact with said control member;
   with said first and second permanent magnets being arranged to have like poles facing each other, and with the arrangement of the float and the two magnets being such that when the float moves downwardly a predetermined amount by liquid being removed from the liquid holding tank, the float will move the first permanent magnet towards the second permanent magnet, and a repelling force generated by the two magnets will cause the second permanent magnet to be forced downwardly against the control member for the valve, in opposition to the biasing force, depressing such control member to in that manner open the valve; and
   wherein said valve is located within one of said ports, with its control member projecting into said chamber, and said second permanent magnet is located within said chamber.

15. A liquid level sensor according to claim 14, comprising an inflow conduit means extending downwardly through said support tube from said inlet port to a fitting at its lower end, and an outflow conduit extending through said support tube from said outlet port to a fitting at its lower end, said fittings being positioned outboardly of the liquid holding tank.

16. A liquid level sensor for use with a liquid holding tank, comprising:
   a support tube having a lower section with a lower end which is connectable to a bottom portion of the liquid holding tank, to extend therefrom into the tank, and an upper end, and an upper section having a lower end connectable to the upper end of said lower section, and including a float cage at its upper end;
   a float within said float cage, adapted to float upon liquid within said liquid holding tank, said float including a downwardly projecting stem portion which is received within the upper section of said support tube;
   a first permanent magnet carried by the stem portion of said float;
   transverse wall means within said support tube completing a fluid tight closure below said first permanent magnet and also completing a chamber within said support tube below said transverse wall;
   a second permanent magnet located within said chamber;
   a normally closed valve located within said support tube below said second permanent magnet, said valve including an upwardly directed, normally extended control member which is depressible to open the valve, said control member being positioned below the second permanent magnet;
   means normally biasing the second permanent magnet away from contact with said control member; and
   with said first and second permanent magnets being arranged to have like poles facing each other, and with the arrangement of the float and permanent magnets being such that when the float moves downwardly a predetermined amount by liquid being removed from the liquid holding tank the float will move the first permanent magnet towards the second permanent magnet, and the repelling force of the two permanent magnets will cause the second permanent magnet to be forced downwardly against the control member for the valve, depressing such control member to in that manner open the valve.

17. A liquid level sensor according to claim 16, comprising screw type connector means for connecting the two sections of the support tube together.

18. A liquid level sensor according to claim 17, wherein the screw type connector means comprises a nipple having an externally threaded section at each of its ends, and wherein each section of the support tube carries a threaded nut which is threadedly connected to a respective one of the threaded end portions of the nipple.

19. Apparatus for signaling a low level condition of a liquid holding tank, comprising:
   a supply of pressurized gas;
   a gas operated sound generator having an inlet for operating gas;
   first gas supplying conduit means extending from the supply of pressurized gas to said gas inlet, said first gas supplying conduit means including a normally closed valve means and gas pressure operated means for opening such valve means;
   second gas supplying conduit means extending from the supply of pressurized gas to said gas pressure operated means for opening said first valve means;
   second normally closed valve means in said second gas supplying conduit means including an upwardly directed normally extended control member which when depressed will open said second valve means, to allow pressurized gas from the supply of pressurized gas to flow to the gas pressure operated means for opening the first valve means, to in turn allow pressurized gas to flow from the supply of pressurized gas to the sound generator, to operate the sound generator; and
   means for depressing said control member in response to a predetermined drop in the level of a liquid in the liquid holding tank, comprising:
   a float located within said liquid holding tank, said float carrying a first permanent magnet positioned above said second valve means;
   means defining a chamber between said first permanent magnet and said second normally closed valve means which includes a fluid tight upper wall;
   means defining an inlet port leading into said chamber and an outlet port leading out from said chamber, said second normally closed valve means being located within one of said ports, with its control member projecting into said chamber;
   a second permanent magnet located within said chamber; and
   means normally biasing said second permanent magnet away from contact with said control member;
   said first and second permanent magnets presenting like poles towards each other, so that each permanent magnet will tend to repel the other, said float and said two permanent magnets being arranged such that when the liquid level drops in the liquid holding tank the first permanent magnet will be moved by the float towards the second magnet and the repelling force of the two magnets will move the second magnet against the operating member, in opposition to the biasing force, to depress such operating member to in that manner open the second valve means.

20. A liquid level sensor for use with a normally closed liquid holding tank having a top wall, a bottom wall, an opening through one of said walls, and a closure for such opening which is connectable to the tank, said sensor comprising:
   a support tube which is connectable to the closure for the opening in the liquid holding tank, to extend inwardly therefrom into the tank;
   a float adapted to float upon liquid in said liquid holding tank, said float carrying an outwardly directed first permanent magnet positioned within the inner portion of said support tube;
   transverse wall means within said support tube, completing a fluid tight closure outward of said first permanent magnet;
   a second permanent magnet positioned outwardly of said transverse wall means; and
   a normally closed valve located within said support tube outward of said second permanent magnet and inward of the closure for said opening, said valve including a normally extending control member which is depressible to open the valve, said control member being positioned outwardly of the second permanent magnet;

with said fluid tight closure completed by said transverse wall means isolating the second permanent magnet and the normally closed valve in a fluid tight manner from the interior of the holding tank; and with said first and second permanent magnets being arranged to have like poles facing each other, and with the arrangement of the float and the two magnets being such that when the liquid level in the liquid holding tank moves toward said transverse wall a predetermined amount, the float will move the first permanent magnet towards the second permanent magnet, and a repelling force generated by the two magnets will cause the second permanent magnet to be urged against the control member for the valve, depressing such control member to in that manner open the valve.

21. A liquid level sensor according to claim 20, wherein a cage for the float is connected to the inner end of said support tube, and said float is located within said cage.

22. A liquid level sensor for use with a normally closed liquid holding tank having a top wall, a bottom wall, an opening through one of said walls, and a closure for such opening which is connectable to the tank, said sensor comprising:

a support tube which is connectable to the closure for the opening in the liquid holding tank, to extend inwardly therefrom into the tank;

a float adapted to float upon liquid in said liquid holding tank, said float carrying an outwardly directed first permanent magnet positioned within the inner portion of said support tube, and said float being located within a cage for said float, said cage being connected to the inner end of said support tube;

transverse wall means within said support tube, completing a fluid tight closure outward of said first permanent magnet;

a second permanent magnet positioned outwardly of said transverse wall means;

a normally closed valve located within said support tube outward of said second permanent magnet, said valve including a normally extending control member which is depressible to open the valve, said control member being positioned outwardly of the second permanent magnet; wherein a chamber is formed within said support tube, outward of said transverse wall means and inward of said normally closed valve; and means defining an inlet port leading into said chamber and an outlet port leading out from said chamber; wherein said valve is located within one of said ports, with its control member projecting into said chamber, and said second permanent magnet is located within said chamber;

with said first and second permanent magnets being arranged to have like poles facing each other, and with the arrangement of the float and the two magnets being such that when the liquid level in the liquid holding tank moves toward said transverse wall, the float will move the first permanent magnet towards the second permanent magnet, and a repelling force generated by the two magnets will cause the second permanent magnet to be urged against the control member for the valve, depressing such control member to in that manner open the valve.

23. A liquid level sensor according to claim 22, comprising an inflow conduit means extending outwardly through said support tube from said inlet port to a fitting at its outer end, and an outflow conduit extending outwardly through said support tube from said outlet to a fitting at its outer end, said fittings being positioned outwardly of the closure for the opening in the liquid holding tank.

* * * * *